March 17, 1964  K. C. WOOLLEY  3,124,874
METHOD OF FASTENING PIPE TOGETHER
Filed Sept. 23, 1960  3 Sheets-Sheet 1
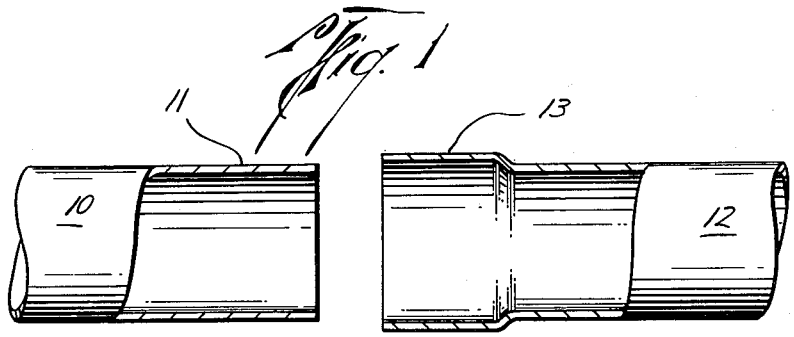
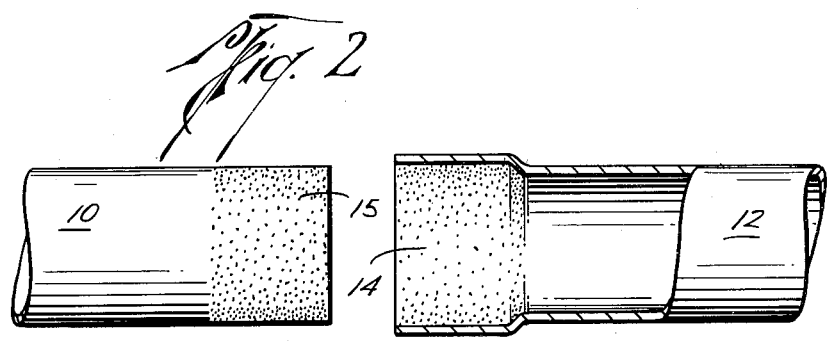
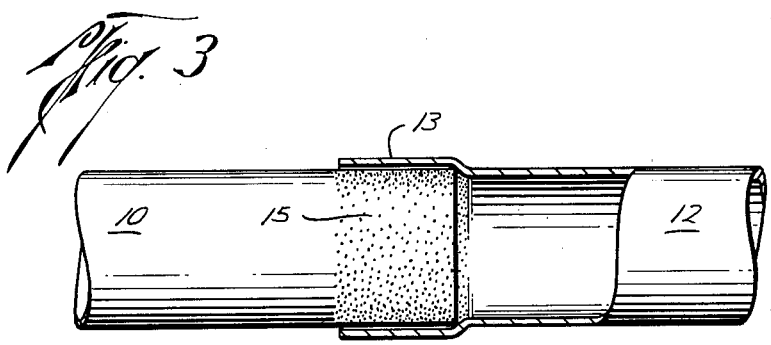
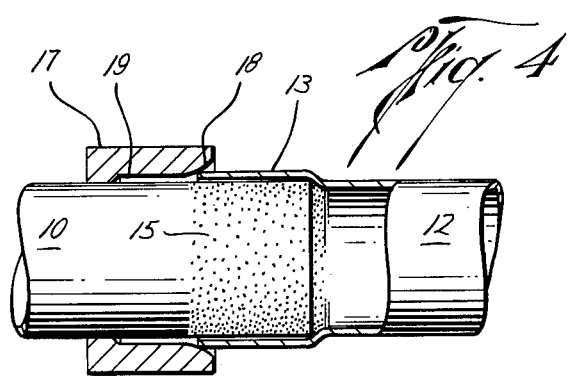
Kenneth C. Woolley
INVENTOR.
BY
ATTORNEYS

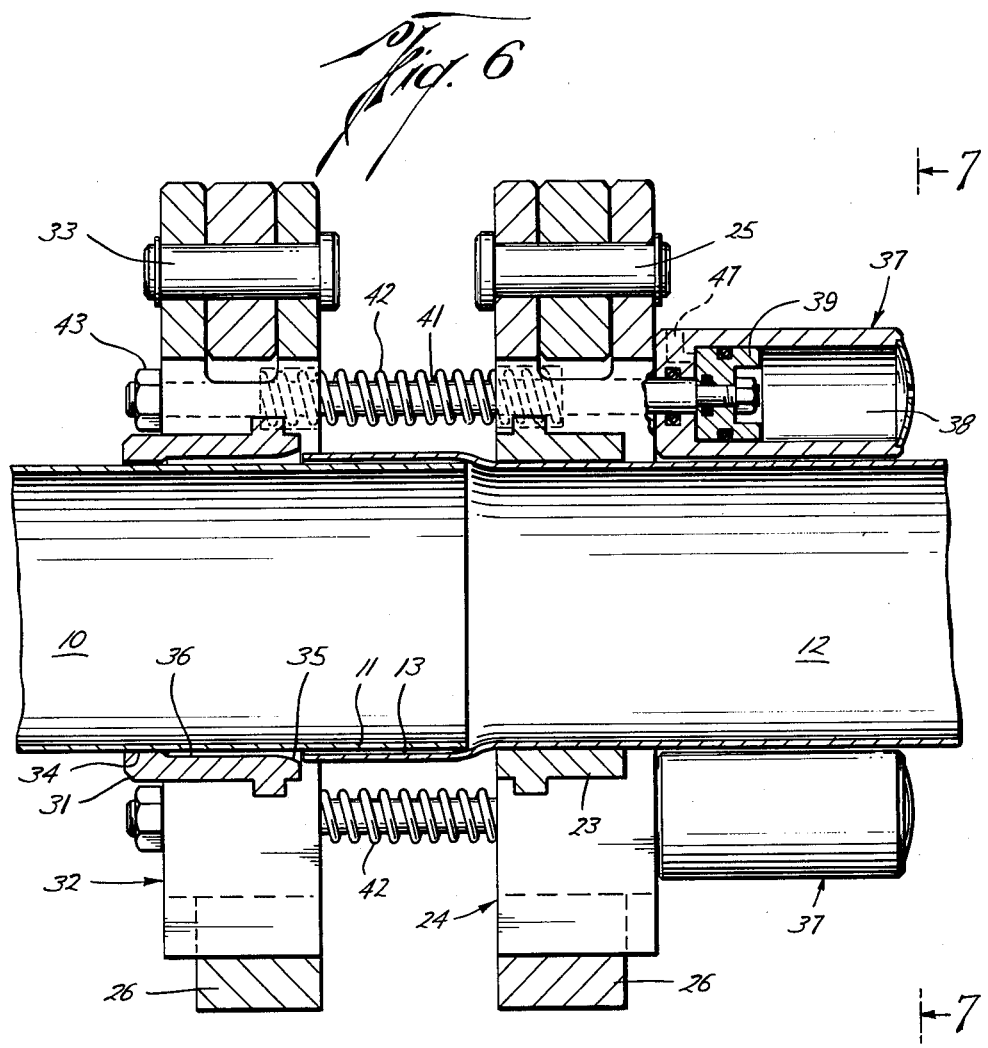

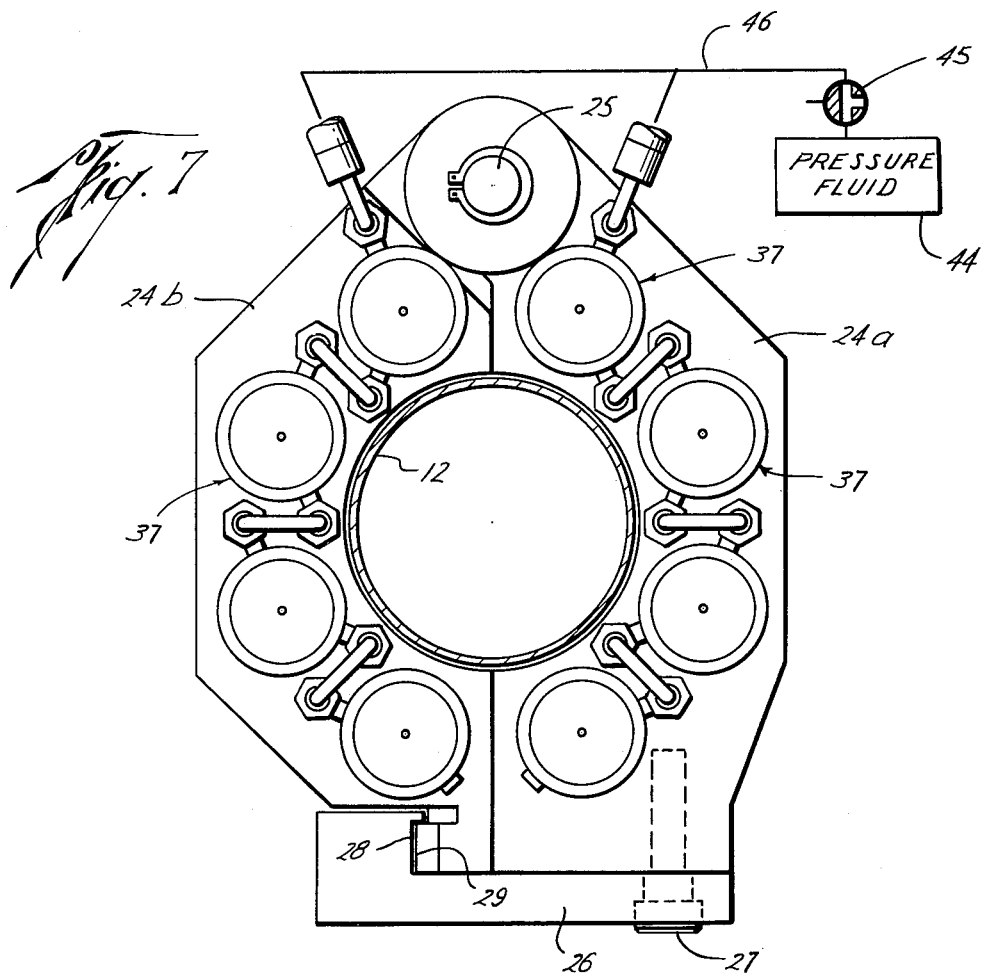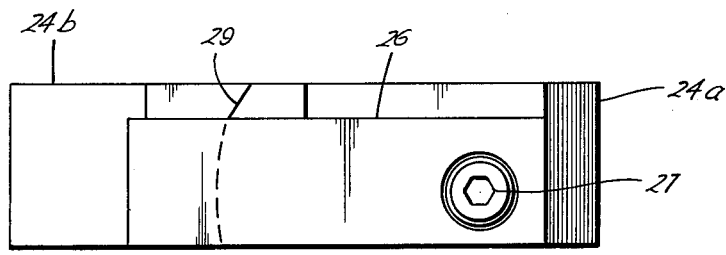

United States Patent Office 3,124,874
Patented Mar. 17, 1964

3,124,874
METHOD OF FASTENING PIPE TOGETHER
Kenneth C. Woolley, Houston, Tex., assignor to Tex-Tube, Inc., Houston, Tex., a corporation of Texas
Filed Sept. 23, 1960, Ser. No. 58,004
4 Claims. (Cl. 29—458)

This invention relates to a method of joining pipe together, and more particularly to a method of joining thin-wall pipe together.

It is an object of this invention to provide a method of joining bell and pin end pipe together in which the bell end of the pipe is crimped in a manner to tightly encircle and grip the pin end of another pipe.

Another object is to provide a method of crimping the bell end of a pipe around the pin end of another pipe in which the tendency of the crimped bell to spring back toward its original diameter after being crimped is substantially eliminated.

Another object is to provide a method of joining bell and pin end pipes together in which the joints are coated with adhesive and then crimped in a manner which prevents any substantial tendency of the bell to return to its original diameter.

Another object is to provide a method for joining bell and pin end pipes together by reducing the diameter of the bell.

Other objects, features and advantages of the invention will be apparent from the drawings, the specification and the claims.

In the drawings, wherein like reference numerals indicate like parts, and wherein an illustrative embodiment of this invention is shown;

FIGURE 1 is a view partly in elevation and partly in cross section of the bell and pin ends of two pipes to be joined together;

FIGURE 2 is a view similar to FIGURE 1 showing the bell and pin ends of the pipes to have been coated with a suitable adhesive;

FIGURE 3 is a view similar to FIGURE 2 showing the pipes of FIGURE 2 to have been moved together;

FIGURE 4 is a view similar to FIGURE 3 showing the swaging die in position about the joint;

FIGURE 5 is a view similar to FIGURE 4 showing the swaging die to have been moved and to have crimped the two pipe ends together;

FIGURE 6 is a view in cross-section through a preferred form of apparatus for swaging pipe together, with the apparatus shown in position about a pipe immediately before the swaging operation is carried out;

FIGURE 7 is a view along the lines 7—7 of FIGURE 6; and,

FIGURE 8 is a worm's eye view of the latching apparatus for latching the holding block in place.

Reference is first made to FIGURES 1 through 5 which illustrate the method of this invention. The pipes to be jointed together are of the type provided with pin and bell ends. For instance, pipe 10 has a pin end 11 and pipe 12 has a bell end 13. The bell end may be formed in any conventional manner. The inner diameter of the bell end is just slightly larger than the outer diameter of the pin end.

The method may be practiced with either coated or uncoated pipe. With uncoated pipe it is preferable to clean both the pin and bell to bare metal. Where the pipe has been coated, the coated surface should be cleaned with a greaseless solvent.

The cleaned bell and pin are preferably coated with a suitable adhesive as shown at 14 and 15, respectively, but it will be understood that the method may be carried out without using the adhesive. Preferably, the adhesive is provided by a material which both aids in fastening the two pipes together and provides a protective coating where needed in the joint. For instance, in coated pipe it is very difficult to provide a complete coating at the joint. Perhaps the hardest area to coat is the end of the pin end of the pipe. In practicing this invention, the adhesive will be extruded from between the bell and pin ends of the pipe and will normally coat the pin end of the pipe. The extruded adhesive will adhere to the coating of the two pipes to give a completely coated run of pipe.

The adhesive is preferably one of the well known epoxy resins generally used for this service, but it will be understood that any adhesive which does not require volatilization of a solvent to set, may be used.

The coated pipes 10 and 12 are then joined together by inserting the pin 11 in the bell 13. Preferably, after the joint is slipped together it is twisted about one turn to evenly distribute the adhesive.

The bell 13 is then reduced in diameter to firmly grip the pin 11 to secure the pipes 10 and 12 together. Preferably, the bell end of pipe 12 is reduced in diameter progressively along its axial dimension beginning at the open end of the bell 13. This action will eliminate the usual inherent spring-back effect of the metal bell to assure maintenance of the reduced diameter and will also insure flow of the adhesive over the end of pin 11 as shown in FIGURE 5 at 16.

By reducing the diameter of the bell incrementally and progressively in an axial or longitudinal direction, as distinguished from reducing the diameter of the entire area of the bell in one simultaneous compression operation, it has been found that the tendency of the bell to spring back toward its original diameter is substantially eliminated. This method of reducing the bell diameter applies a progressive squeezing action to the bell with the result that the metal fibers of the bell are deformed in a manner which, in effect, leaves them in a static condition so that the usual spring-back action of said metal fibers has been substantially reduced. Actual practice shows that where the bell is swaged in increments along the axial dimension thereof, the otherwise normal tendency of the bell to spring back towards its original diameter has been substantially destroyed.

It is preferred that the bell be swaged by drawing a ring-like swaging die 17 over the bell from the open end thereof. This die has an internal diameter which is slightly smaller than the external diameter of the bell and as it is moved over the bell it deforms the metal of the bell inwardly to reduce in diameter. This action is carried out incrementally on successive annular areas of the bell beginning at its open end and progressing along the pipe.

It will be noted that the swaging die 17 has a throat radius 18 at its forward end which initially engages the end of the bell to create an extruding force which results in reducing the diameter of that portion of the bell so engaged. The throat radius 18 blends or merges into a cylindrical section of constant diameter 19 which functions as a sizing section.

With the pin end of the pin in place in the bell, the swaging action functions to urge the inside surface of the bell 13 into firm engagement with the outer surface of the pin 11, and in actual practice the size of the bore 19 of the die is such that sufficient squeezing action is applied to the bell and to the pin within said bell to slightly reduce the normal outer diameter of said pin, whereby a close firm contact between the bell and pin is produced. Under this condition the inherent spring-back action of the pin, which is tending to return the pin to its normal diameter, acts to maintain the tight contact between the parts. Due to the compression induced in the pin 11 during the swaging action, an outward force is applied inside of the bell 13 as the die continues to move thereover. Also, the pin functions to cause the metal of the bell which is acted upon by the radius 18 to conform to the inner surface of the sizing section 19 of the die.

As the die 17 is pulled over the bell 13, the two pipes are moved into firm engagement with each other and the adhesive coating therebetween is squeezed out toward the end of pin 15. As the bell is being extruded in front of the die, the bell will tend to bow outwardly at its heel portion 21 as shown in FIGURE 5, and excess adhesive 22 will fill the space between the pin 11 and the bowed-out portion 21 of bell 13. As previously explained, a slight amount of the adhesive will flow past the end of pin 11 to coat the end of the pin and complete the protective coating as shown at 16 in FIGURE 5.

Reference is now made to FIGURES 6, 7 and 8 in which a preferred form of portable crimping tool is shown for crimping pipe in the manner heretofore explained. This tool includes a holding die 23 formed in two semi-circular parts and held about the pipe by the fixed die holder indicated generally at 24. It will be noted that the fixed die holder is in two parts 24a and 24b, and that these two parts are pivoted together by pivot pin 25. The holding die 23 may be fastened in the fixed die holder in any desired manner.

As best shown in FIGURE 7, the fixed die holder is provided with a latching arm 26 secured to die holder portion 24a by a pivot pin 27. The arm 26 has a cam portion 28 which cooperates with a cam portion 29 carried by fixed die holder portion 24b. When the two sections of the fixed die holder are brought together about a pipe, the arm 26 may be moved into the position shown in FIGURE 7 to latch the fixed die holder in place.

The fixed die 23 has an inner diameter which is substantially equal to the outer diameter of pipe 12, and it is placed about the pipe 12 immediately adjacent the root of bell 13 so as to bear against the bell and prevent movement of the fixed die holder toward the open end of the bell.

The movable die 31 corresponds to die 17 shown in FIGURES 1 through 5. This die is made of two semi-circular halves and is carried in two semi-circular movable die holders indicated generally at 32. These die holders are substantially identical with fixed die holder 24 and pivot about the pivot pin 33 with which they are secured together on one side. After the die holder has been wrapped about a pipe, the two sections of the die holder are secured together with a latch mechanism identical to that provided on the fixed die holder.

The movable die has a heel portion 34 which is slightly larger than the outer diameter of pipe 10. At the forward end of the movable die a radius 35 is provided and the mouth of the die at the junction between the radius and the forward edge of the die is of a diameter greater than the outer diameter of bell 13. At the inner extremity of radius 35 the die has a relatively long cylindrical surface 36 which extends from radius 35 to the heel portion 34. This cylindrical portion has a diameter somewhat greater than the outer diameter of pin 11 and provides a space for receiving bell 13 between the die and pin 11. The cylindrical surface is equal in diameter to the smallest diameter of radius 35.

Means for moving the movable die toward the fixed die may be provided in any desired manner, such as by the plurality of hydraulic jacks indicated generally at 37. Each of these jacks includes a cylinder 38 having a piston 39 reciprocal therein. The piston carries a rod 41 which passes through both the fixed die holder 24 and movable die holder 32. A spring 42 is interposed between each die holder and a nut 43 on the free end of rod 41 completes the assembly. Pressure fluid from a suitable source 44 is introduced or exhausted from cylinder 37 through three-way valve 45, conduit 46 and inlet 47 into the cylinder 38. All of the hydraulic jack assemblies are identical.

In operation, the bell and pin of pipe to be joined together are cleaned, coated with adhesive, and positioned in crimping position as shown in FIGURES 1, 2 and 3. Thereafter, the crimping tool is wrapped about the joint and the two halves of the movable and fixed die holders secured together with the fixed die holder against the shoulder provided at the root of bell 13. Three-way valve 45 is then positioned to introduce pressure fluid from source 44 into each of cylinders 38 to pull the movable die 31 over bell 13. As the movable die passes over the bell, the action previously explained with reference to FIGURES 4 and 5 will be carried out. After the crimping operation is completed, the three-way valve 45 may be moved to venting position to vent cylinders 37 and the fixed and movable die holders released from the pipe. During the releasing operation the springs 42 will slide the fixed and movable die holders apart and return the pistons 39 to the position shown in FIGURE 6, and the crimping tool will be ready for the next operation.

The foregoing disclosure and description of the invention is illustrative and explanatory thereof and various changes in the size, shape and materials, as well as in the details of the illustrated construction, may be made within the scope of the appended claims without departing from the spirit of the invention.

What I claim is:

1. The method of fastening together metal pipe with substantial springback characteristics and having a bell end and a pin end comprising, inserting the pin end of one pipe into the bell end of another pipe, and progressively reducing the diameter of the bell along its axial dimension and radially inwardly deforming both the bell and pin by drawing a ring-type swaging die of less diameter than the bell over the bell in a direction along the axial dimension of the bell, said die having a cylindrical portion axially extending from the mouth of the die to prevent the radially inwardly deformed portion of the bell adjacent the mouth of the die from springing back as the bell and pin are deformed.

2. The method of fastening together metal pipe with substantial springback characteristics and having a bell end and a pin end comprising, inserting the pin end of one pipe into the bell end of another pipe, and progressively reducing the diameter of the bell along its axial dimension and radially inwardly deforming both the bell and pin by drawing a ring-type swaging die of less diameter than the bell over the bell in a direction along the axial dimension of the bell beginning at the open end of the bell, said die having a cylindrical portion axially extending from the mouth of the die to prevent the radially inwardly deformed portion of the bell adjacent the mouth of the die from springing back as the bell and pin are deformed.

3. The method of fastening together metal pipe with substantial springback characteristics and having a bell end and a pin end comprising, coating the inside of said bell and the outside of said pin with adhesive, inserting the pin end of one pipe into the bell end of another pipe, and progressively reducing the diameter of the bell along its axial dimension and radially inwardly deforming both the bell and pin by drawing a ring-type swaging die of less diameter than the bell over the bell in a direction along the axial dimension of the bell beginning at the open end of the bell, said die having a cylindrical portion axially extending from the mouth of the die to prevent the radially inwardly deformed portion of the bell adjacent the mouth of the die from springing back as the bell and pin are deformed, a portion of said adhesive being extruded from between the reduced portions of the bell and pin to form a seal between the bell and pin at the open end of the pin.

4. The method of fastening together metal pipe with substantial springback characteristics and having a bell end and a pin end comprising, inserting the pin end of one pipe into the bell end of another pipe and progressively reducing the diameter of the bell along its axial dimension and radially inwardly deforming both the bell and pin by drawing a ring-type swaging die of less diameter than the bell over the bell in a direction along the axial dimension of the bell beginning at the open end of the bell to grip the pin of the other pipe, said die having a radius at its mouth and a cylindrical portion of equal diameter to the smallest diameter of the radius immediately to the rear of the radius maintaining the radially inwardly deformed portion of the bell adjacent the mouth of the die from springing back as the bell and pin are deformed.

References Cited in the file of this patent

UNITED STATES PATENTS

| | | |
|---|---|---|
| 1,752,976 | Cowles | Apr. 1, 1930 |
| 1,827,297 | Moore | Oct. 13, 1931 |
| 1,839,964 | Harvey | Jan. 5, 1932 |
| 1,911,775 | Smith et al. | May 30, 1933 |
| 2,046,504 | Cooper | July 7, 1936 |
| 2,158,538 | Gish | May 16, 1939 |
| 2,198,149 | Bangert | Apr. 23, 1940 |
| 2,211,537 | Dickinson | Aug. 13, 1940 |

FOREIGN PATENTS

| | | |
|---|---|---|
| 14,993 | Great Britain | 1886 |
| 72,272 | Switzerland | May 1, 1916 |